United States Patent [19]
Topcik

[11] Patent Number: 4,812,505
[45] Date of Patent: Mar. 14, 1989

[54] TREE RESISTANT COMPOSITIONS

[75] Inventor: Barry Topcik, Bridgewater, N.J.

[73] Assignee: Union Carbide Corporation, Danbury, Conn.

[21] Appl. No.: 156,599

[22] Filed: Mar. 1, 1988

Related U.S. Application Data

[63] Continuation-in-part of Ser. No. 134,859, Dec. 18, 1987, which is a continuation of Ser. No. 50,397, May 18, 1987, abandoned.

[51] Int. Cl.$^4$ ................................................ C08K 5/06
[52] U.S. Cl. .................................... 524/377; 524/378; 524/570; 524/578; 524/579
[58] Field of Search ............... 524/377, 378, 570, 578, 524/579

[56] References Cited

U.S. PATENT DOCUMENTS

| 4,305,849 | 12/1981 | Kawasaki et al. | 252/567 |
| 4,373,048 | 2/1983 | Schubert | 524/377 |
| 4,440,671 | 4/1984 | Turbett | 252/578 |
| 4,612,139 | 9/1986 | Kawasaki et al. | 252/511 |

Primary Examiner—Herbert J. Lilling
Attorney, Agent, or Firm—Saul R. Bresch

[57] ABSTRACT

1. A heat and water tree resistant composition comprising:
   (a) a copolymer of ethylene and an alpha-olefin having 4 to 8 carbon atoms, said copolymer having a density equal to or less than 0.91 gram per cubic centimeter; and
   (b) a polyethylene glycol having a molecular weight in the range of about 1000 to about 20,000 in an amount of about 0.1 to about 20 percent by weight based on the weight of the copolymer.

12 Claims, No Drawings

TREE RESISTANT COMPOSITIONS

This application is a continuation-in-part of application Ser. No. 134,859 filed on Dec. 18, 1987, which is a continuation of application Ser. No. 050,397 filed on May 18, 1987, now both abandoned.

TECHNICAL FIELD

This invention relates to compositions which are useful in medium voltage electrical insulation because of their resistance to heat and water trees.

BACKGROUND ART

Ethylene/propylene copolmers and terpolymres (EPRs) currently being used for insulating medium voltage cables. These polymers are generally cross-linked using peroxides and are utilized in combination with various additives and fillers. As insulation for cables, the EPRs require a filler for reinforcement because of their lack of strength. A filler is also required for processing, e.g., in an extruder, since unfilled EPRs do not extrude smoothly.

It is desirable to add polyethylene glycol, a well known water tree growth inhibitor, to medium voltage insulation. Water trees occur when an organic polymeric insulation material is subjected to an electrical field over a long period of time in the presence of water in liquid or vapor form. They are called trees because they appear to have a trunk with branches. Water trees grow from points in the insulation where there are voids or contaminants such as metal, lint, or other foreign material. Since it is difficult to eliminate voids or extraneous matter from the insulation, water tree growth inhibitors have been developed. The aforementioned polyethylene glycol is one that is found to be superior in its inhibiting qualities. Unfortunately, polyethylene glycol is found to degrade EPRs when crosslinked specimens are exposed to accelerated heat aging tests at elevated temperatures.

DISCLOSURE OF THE INVENTION

An object of this invention, therefore, is to provide a heat and water tree resistant composition adapted for use in medium voltage electrical insulation, which has sufficient strength so as not to require fillers, will not be degraded by polyethylene glycol, and is otherwise equivalent in physical properties to the EPRs.

Other objects and advantages will become apparent hereinafter.

According to the present invention, the above object is met by a heat and water tree resistant composition comprising:

(a) a copolymer of ethylene and at least one alpha-olefin having 4 to 8 carbon atoms, said copolymer having a density equal to or less than 0.91 gram per cubic centimeter; and (b) a polyethylene glycol having a molecular weight in the range of about 1000 to about 20,000 in an amount of about 0.1 to about 20 percent by weight based on the weight of the copolymer.

DETAILED DESCRIPTION

In this specification, the term "copolymer" is considered to mean a polymer based on two or more comonomers. The ethylene/alpha olefin copolymer can be prepared by the process described in European Patent Application No. 0 120 501 published on Oct. 3, 1984, which is incorporated by reference herein. The density of the copolymer is equal to or less than 0.91 gram per cubic centimeter and is preferably in the range of about 0.85 to 0.89 gram per cubic centimeter. The portion of the copolymer attributed to the alpha-olefin is in the range of about 5 to about 50 percent by weight based on the weight of the copolymer and preferably is in the range of the about 15 to about 40 percent by weight. The balance of the copolymer is based on ethylene. Within the noted density range, the higher densities represent increased strength and are relatively less rubbery. These copolymers are considered to be soft polymers because they are semi-crystalline. They can also be described as rubber-like. Soft polymers can be processed on or in cool processing equipment, i.e., the copolymer mixes readily without the use of heat.

Examples of alpha-olefins are 1-butene, 1-hexene, and 1-octene. The copolymer, in addition to being based on the comonomers ethylene and an alpha-olefin of 4 to 8 carbon atoms, can be also based on a propylene comonomer provided that no more than about 15 percent by weight of the copolymer is attributed to propylene. The copolymer can also be subjected to grafting, or the comonomers can be copolymerized, with a vinyl alkoxy silane to make them hydrolyzable.

The polyethylene glycol is a known water tree inhibitor described, for example, in U.S. Pat. No. 4,612,139 issued on Sept. 16, 1986, which is incorporated by reference herein. It can have a molecular weight in the range of about 1000 to about 20,000 and at least 30 carbon atoms, preferably at least 80 carbon atoms. The polyethylene glycol is present in the insulation composition in an amount of about 0.1 to about 20 parts by weight based on 100 parts by weight of the base ethylene/alpha-olefin copolymer and is preferably present in an amount in the range of about 0.1 to about 2 parts by weight.

The ethylene/alpha-olefin copolymer having a density equal to or less than 0.91 can be advantageously blended with (i) polyethylenes having densities in the range of about 0.91 to 0.93 prepared by conventional high pressure techniques; (ii) ethylene copolymers wherein at least one comonomer is a vinyl acid, a vinyl acid ester, or a derivative of either; (iii) ethylene/hydrolyzable silane copolymers; (iv) ethylene terpolymers based on at least two comonomers referred to in items (ii) and (iii); (v) ethylene terpolymers based on alphaolefins having 3 to 8 carbon atoms; (vi) ethylene/propylene rubbers; (vii) ethylene/propylene/diene monomer rubbers; and (viii) hydrolyzable graft polymers produced by grafting silane to any of items (i) to (vii).

The high pressure technique referred to in (i) is described in Introduction to Polymer Chemistry, Stille, Wiley and Sons, New York, 1982, at pages 149 to 153. The ethylene/silane copolymer can be prepared by the process described in U.S. Pat. No. 3,225,018 and the terpolymer by the process described in U.S. Pat. No. 4,291,136. The aforementioned publications are incorporated by reference herein.

The polymers which are blended with the base ethylene/alpha-olefin copolymer can be blended in a weight ratio of polymer to copolymer of about 1:9 to about 9:1 and preferably in a weight ratio of about 7:3 to about 3:7.

Various conventional additives can be added in conventional amounts to the insulation compositions. Typical additives are antioxidants, ultraviolet absorbers, antistatic agents, pigments, dyes, fillers including carbon black and aluminum silicate, slip agents, fire retardants, stabilizers, crosslinking agents, halogen scavengers, smoke inhibitors, crosslinking boosters, processing aids, lubricants, plasticizers, and viscosity control agents. Fillers can be included in amounts of about 5 to about 60 percent by weight based on the weight of the total composition.

One additive of especial interest as a substitute for the commonly used red lead oxide as a scavenger for residual halogen is a metal carboxylate, which, on reaction with a halogen, yields a water insoluble product. Examples of suitable metal carboxylates are dioctyltin maleate, dibutyltin dilaurate, stannous acetate, and stannous octoate.

The invention is illustrated by the following examples.

EXAMPLES 1 TO 12

Each insulation composition is blended as follows: the components are charged into a mixer such as a Brabender or Banbury mixer. The mixture is fluxed at about 150° C. to 170° C. for about 3 minutes at about 60 rpm. The batch is discharged at about 160° C. and is homogenized on a two-roll mill, and removed from the two-roll mill as a sheet. Standard test specimens or slabs (150 millimeters X 150 millimeter X 1.9 millimeters thick) are cured, vulcanized, or crosslinked in accordance with ASTM D-15-72 ("Compound and Sample Preparation for Physical Testing of Rubber Products"). Dumbbell shaped test specimens are cut from the slabs for stress-strain testing in accordance with ASTM D-412-6B ("Tension Testing of Vulcanized Rubber"). ASTM D-573-673 ("Accelerated Aging of Vulcanized Rubber") is used to test the heat resistance of crosslinked specimens. Crosslinking of the test slabs is carried out for 40 minutes at 170° C. Accelerated heat aging is conducted for 1, 2, and 3 weeks at 150° C. The percent tensile strength and elongation retained after these aging periods is used as a measure of the heat resistance of the compositions. The higher the retention of properties, the better the heat resistance.

The components are as follows:

1. ethylene/propylene/1,4 hexadiene terpolymer rubber (ethylene portion approx. 74 weight percent or 81 mole percent)

2. ethylene/propylene/1,4 hexadiene terpolymer rubber (ethylene portion approx. 56 weight percent or 66 mole percent)

3. ethylene/propylene/ethylidene norbornene (ethylene portion approx. 50 weight percent or 64 mole percent)

4. ethylene/propylene copolymer rubber (ethylene portion approx. 65 weight percent or 73 mole percent)

5. ethylene/1-butene copolymer (1-butene portion approx. 26 weight percent, density 0.88)

6. ethylene/1-butene copolymer (1-butene portion approx. 18 weight percent, density 0.89)

7. polyethylene (density 0.92)

8. silane treated clay (aluminum silicate)(filler)

9. zinc oxide (pH modifier)

10. paraffin (lubricant)

11. gamma-methacryloxypropyltrimethoxy silane (coupling agent)

12. zinc 2-mercaptotoluimidazole (anti-oxidant)

13. low temperature reaction product of diphenylamine and acetone (anti-oxidant)

14. dicumyl peroxide (curing agent)

15. organosilane ester (cure booster)

16. red lead masterbatch (90% by weight $Pb_3O_4$, 10% by weight EPR)(Lead oxide is used to scavenge residual halogen) (EPR - see item 4 above)

17. dioctyltin maleate (this compound is used to scavenge residual halogen)

18. polyethylene glycol (molecular weight = 20,000) (water tree inhibitor)

The stress-strain tests applied to the samples are as follows:

1. 100% modulus (psi)—ASTM 412.
2. 300% modulus (psi)—ASTM 412.
3. tensile strength (psi)—ASTM 412.
4. % elongation—ASTM 412
5. Shore A Hardness—ASTM 412
6. % tensile retained
7. % elongation retained Note: Examples 1, 2, and 3 contain polyethylene glycol together wtih dioctyl tin meleate, red lead oxide, or a combination of both. The properties of the compositions of these examples are severly deteriorated after aging for two weeks at 150° C. The composition of example 4, which is devoid of polyethylene glycol, ages satisfactorily. The compositions of examples 5 and 6, which contain both polyethylene glycol and dioctyltin maleate, show excellent heat aging.

The following Tables set forth the variables and results. Each example represents one test specimen. Table I gives the component proportions in each specimen. Table II sets forth the results of tests performed on specimens after the specimens are cured for 40 minutes at 170° C. Table III sets forth the results of tests performed on specimens after specimens are aged in an oven for one week at 150° C. Table IV sets forth the results of tests performed on specimens after the specimens are aged in an oven for two weeks at 150° C. Table V sets forth the results of tests performed on specimens after the specimens are aged in an oven for three weeks at 150° C.

TABLE I

| Component Number | Examples | | | | | | | | | | | |
|---|---|---|---|---|---|---|---|---|---|---|---|---|
| | 1 | 2 | 3. | 4. | 5. | 6. | 7. | 8. | 9. | 10 | 11 | 12 |
| 1 | — | — | — | — | — | — | 50 | — | — | — | — | — |
| 2 | — | — | — | — | — | — | — | 50 | — | — | — | — |
| 3 | 50 | 50 | 50 | 50 | — | — | — | — | 50 | — | — | — |
| 4 | — | — | — | — | — | — | — | — | — | 50 | — | — |
| 5 | — | — | — | — | 50 | — | — | — | — | — | 50 | — |
| 6 | — | — | — | — | — | 50 | — | — | — | — | — | 50 |
| 7 | 50 | 50 | 50 | 50 | 50 | 50 | 50 | 50 | 50 | 50 | 50 | 50 |
| 8 | 30 | 30 | 30 | 30 | 30 | 30 | 30 | 30 | 30 | 30 | 30 | 30 |
| 9 | 5 | 5 | 5 | 5 | 5 | 5 | 5 | 5 | 5 | 5 | 5 | 5 |
| 10 | 3 | 3 | 3 | 3 | 3 | 3 | 3 | 3 | 3 | 3 | 3 | 3 |
| 11 | 1 | 1 | 1 | 1 | 1 | 1 | 1 | 1 | 1 | 1 | 1 | 1 |
| 12 | 2 | 2 | 2 | 2 | 2 | 2 | 2 | 2 | 2 | 2 | 2 | 2 |
| 13 | 1 | 1 | 1 | 1 | 1 | 1 | 1 | 1 | 1 | 1 | 1 | 1 |
| 14 | 2.6 | 2.6 | 2.6 | 2.6 | 2.6 | 2.6 | 2.6 | 2.6 | 2.6 | 2.6 | 2.6 | 2.6 |
| 15 | — | — | — | — | — | 0.7 | 0.7 | 0.7 | 0.7 | 0.7 | 0.7 | 0.7 |
| 16 | — | 5 | 5 | — | — | — | 5 | 5 | 5 | 5 | 5 | 5 |
| 17 | 0.3 | 0.3 | — | 0.3 | 0.3 | 0.3 | 0.3 | 0.3 | 0.3 | 0.3 | 0.3 | 0.3 |
| 18 | 0.7 | 0.7 | 0.7 | — | 0.7 | 0.7 | 0.7 | 0.7 | 0.7 | 0.7 | 0.7 | 0.7 |

TABLE II

| Test Number | Examples | | | | | | | | | | | |
|---|---|---|---|---|---|---|---|---|---|---|---|---|
| | 1 | 2 | 3. | 4. | 5. | 6. | 7. | 8. | 9. | 10 | 11 | 12 |
| 1 | 970 | 1010 | 1030 | 985 | 1480 | 1290 | 1140 | 905 | 985 | 1050 | 1540 | 1450 |
| 2 | 1710 | 1780 | 1830 | 1790 | 2030 | 1670 | 1890 | 1460 | 1750 | 1610 | 2010 | 1990 |
| 3 | 2260 | 2030 | 2030 | 2290 | 2600 | 2220 | 2210 | 1740 | 2030 | 2240 | 2590 | 2590 |
| 4 | 410 | 350 | 340 | 400 | 480 | 510 | 410 | 430 | 350 | 480 | 510 | 490 |
| 5 | 93 | 94 | 94 | 93 | 98 | 97 | 96 | 92 | 93 | 95 | 95 | 98 |

TABLE III

| Test Number | Examples | | | | | | | | | | | |
|---|---|---|---|---|---|---|---|---|---|---|---|---|
| | 1 | 2 | 3. | 4. | 5. | 6. | 7. | 8. | 9. | 10 | 11 | 12 |
| 1 | 1080 | 1150 | 1150 | 1070 | 1570 | 1450 | 1290 | 1030 | — | 1170 | 1450 | 1610 |
| 2 | 1990 | — | — | 1970 | 2260 | 1930 | 2230 | 1740 | — | 1850 | 1970 | 2310 |
| 3 | 2170 | 1800 | 1800 | 2250 | 2550 | 2280 | 2360 | 1980 | 900 | 1920 | 2340 | 2630 |
| 4 | 330 | 230 | 200 | 350 | 420 | 480 | 340 | 400 | 40 | 340 | 480 | 410 |
| 5 | 94 | 94 | 94 | 93 | 98 | 97 | 97 | 94 | 94 | 95 | 98 | 98 |
| 6 | 96 | 88 | 81 | 98 | 98 | 102 | 117 | 113 | 44 | 85 | 90 | 101 |
| 7 | 80 | 65 | 58 | 87 | 87 | 94 | 83 | 93 | 11 | 70 | 94 | 83 |

TABLE IV

| Test Number | Examples | | | | | | | | | | | |
|---|---|---|---|---|---|---|---|---|---|---|---|---|
| | 1 | 2 | 3. | 4. | 5. | 6. | 7. | 8. | 9. | 10 | 11 | 12 |
| 1 | — | — | — | 1150 | 1560 | 1430 | — | 1020 | — | — | 1420 | 1590 |
| 2 | — | — | — | 2130 | 2260 | 1900 | — | — | — | — | 1940 | 2240 |
| 3 | 895 | 805 | 855 | 2130 | 2380 | 2210 | 1070 | 1370 | 575 | 1010 | 2220 | 2590 |
| 4 | 70 | 10 | 10 | 300 | 350 | 480 | 10 | 20 | <10 | 10 | 440 | 420 |
| 5 | 94 | 95 | 96 | 94 | 98 | 98 | 98 | 94 | 98 | 98 | 97 | 100 |
| 6 | 39 | 39 | 42 | 93 | 91 | 99 | 48 | 78 | 28 | 45 | 86 | 100 |
| 7 | 17 | 2 | 2 | 75 | 72 | 94 | 2 | 46 | 0 | 2 | 86 | 85 |

TABLE V

| Test Number | Examples | | | | | | | | | | | |
|---|---|---|---|---|---|---|---|---|---|---|---|---|
| | 1 | 2 | 3. | 4. | 5. | 6. | 7. | 8. | 9. | 10 | 11 | 12 |
| 1 | — | — | — | — | — | — | — | — | — | — | 1410 | 1590 |
| 2 | — | — | — | — | — | — | — | — | — | — | 1900 | 2310 |
| 3 | — | — | — | — | — | — | 330 | 330 | 125 | 295 | 2100 | 2480 |
| 4 | — | — | — | — | — | — | <10 | <10 | <10 | <10 | 420 | 365 |
| 5 | — | — | — | — | — | — | 100 | 94 | 97 | 97 | 98 | 97 |
| 6 | — | — | — | — | — | — | 15 | 18 | 6 | 13 | 81 | 95 |
| 7 | — | — | — | — | — | — | 0 | 0 | 0 | 0 | 82 | 74 |

I claim:

1. A heat and water tree resistant composition comprising:
   (a) a copolymer of ethylene and at least one alpha-olefin having 4 to 8 carbon atoms, said copolymer having a density equal to or less than 0.91 gram per cubic centimeter; and
   (b) a polyethylene glycol having a molecular weight in the range of about 1000 to about 20,000 in an amount of about 0.1 to about 20 percent by weight based on the weight of the copolymer.

2. The composition defined in claimed 1 wherein the density of the copolymer is in the range of about 0.85 to about 0.89 gram per cubic centimeter.

3. The composition defined in claim 1 wherein the portion of the copolymer attributed to the alpha-olefin is in the range of about 5 to about 50 percent by weight based on the weight of the copolymer.

4. The composition defined in claim 1 additionally containing a polymer selected from the group consisting of (i) polyethylene having a density in the range of 0.91 to 0.93 gram per cubic centimeter; (ii) ethylene copolymers wherein at least one comonomer is a vinyl acid, a vinyl acid ester, or a derivative of either; (iii) ethylene/hydrolyzable silane copolymers; (iv) ethylene terpolymers based on at least two comonomers referred to in items (ii) and (iii); (v) ethylene terpolymers based on alpha-olefins having 3 to 8 carbon atoms; (vi) ethylene/propylene rubbers; (vii) ethylene/propylene/diene monomer rubbers; and (viii) hydrolyzable graft polymers produced by grafting silane to any of items (i) to (vii), said polymer being present in the composition in a weight ratio of polymer to copolymer of about 1:9 to about 9:1.

5. The composition defined in claim 4 additionally containing a metal carboxylate, which, on reaction with a halogen, yields a water insoluble product.

6. The composition defined in claim 4 wherein the metal carboxylate is dioctyltin maleate.

7. The composition defined in claim 1 wherein the alpha-olefin is 1-butene.

8. The composition defined in claim 4 wherein the alpha-olefin is 1-butene.

9. The composition defined in claim 1 wherein the copolymer is silane modified to provide a hydrolyzable copolymer.

10. The composition defined in claim 1 additionally including filler in an amount of about 5 to about 60 percent by weight based on the total weight of the composition.

11. The composition defined in claim 4 additionally including filler in an amount of a about 5 to about 60 percent by weight based on the total weight of the combustion.

12. The composition defined in claim 1 wherein the copolymer is also based on propylene provided that the portion of the copolymer attributed to propylene is no greater than 15 percent by weight of the copolymer.

* * * * *